United States Patent
Guan et al.

(10) Patent No.: US 8,363,909 B2
(45) Date of Patent: Jan. 29, 2013

(54) IMAGE PROCESSING APPARATUS, IMAGE PROCESSING METHOD, AND COMPUTER PROGRAM PRODUCT

(75) Inventors: Haike Guan, Kanagawa (JP); Gang Wang, Beijing (CN); Zhongchao Shi, Beijing (CN); Tao Li, Beijing (CN); Du Cheng, Beijing (CN)

(73) Assignee: Ricoh Company, Limited, Tokyo (JP)

( * ) Notice: Subject to any disclaimer, the term of this patent is extended or adjusted under 35 U.S.C. 154(b) by 913 days.

(21) Appl. No.: 12/073,500

(22) Filed: Mar. 6, 2008

(65) Prior Publication Data

US 2008/0232693 A1    Sep. 25, 2008

(30) Foreign Application Priority Data

Mar. 20, 2007  (JP) ................................ 2007-073455
Jan. 7, 2008   (JP) ................................ 2008-000708

(51) Int. Cl.
    *G06K 9/00* (2006.01)
(52) U.S. Cl. ........ 382/118; 382/103; 382/115; 382/181; 382/226; 382/227
(58) Field of Classification Search .................. 382/103, 382/115, 118, 181, 226, 227
    See application file for complete search history.

(56) References Cited

U.S. PATENT DOCUMENTS

| | | | |
|---|---|---|---|
| 5,978,100 A | 11/1999 | Kinjo | |
| 2003/0108244 A1 | 6/2003 | Li et al. | |
| 2005/0104848 A1 | 5/2005 | Yamaguchi et al. | |
| 2005/0238217 A1* | 10/2005 | Enomoto et al. | 382/128 |
| 2005/0271245 A1* | 12/2005 | Ai et al. | 382/100 |
| 2006/0120572 A1 | 6/2006 | Li et al. | |
| 2006/0120604 A1 | 6/2006 | Kim et al. | |
| 2006/0204110 A1 | 9/2006 | Steinberg et al. | |
| 2006/0285750 A1 | 12/2006 | Okada et al. | |

FOREIGN PATENT DOCUMENTS

| | | |
|---|---|---|
| CN | 1885910 | 12/2006 |
| EP | 1 727 087 | 11/2006 |
| JP | 09-138470 | 5/1997 |
| JP | 2000-137788 | 5/2000 |
| JP | 2004-334836 | 11/2004 |
| JP | 2005-100084 | 4/2005 |
| JP | 2005-108229 | 4/2005 |

OTHER PUBLICATIONS

Chinese Office Action and English translation thereof dated Apr. 2, 2010.
Extended European Search Report dated Dec. 15, 2010 for corresponding Application No. 08250976.1.
Yong Ma et al., "Real-Time Rotation Invariant Face Detection Based on Cost-Sensitive Adaboost", Sep. 14, 2003, pp. 921-924.

(Continued)

*Primary Examiner* — Wesley Tucker
(74) *Attorney, Agent, or Firm* — Harness, Dickey & Pierce, P.L.C.

(57) ABSTRACT

An image processing apparatus that detects a face area from image information includes a pattern database, a face-direction determining unit, and a face-area detector. The face-direction determining unit determines, as a face direction, a direction in which a face image in image information is upright based on determination pattern information stored in the pattern database. The face-area detector matches the direction of the image information with the direction of the determination pattern information based on the face direction, and detects a face area from the image information.

20 Claims, 12 Drawing Sheets

OTHER PUBLICATIONS

Chang Huang et al., "Omni-Directional Face Detection Based on Real Adaboost", Oct. 24, 2004, pp. 593-596.
Chang Huang et al., "Boosting Nested Cascade Detector for Multi-View Face Detection", vol. 2, 2004, pp. 415-418.
Chang Huang et al., "Vector Boosting for Rotation Invariant Multi-View Face Detection", Oct. 17, 2005, pp. 446-453.
Yao Zhengrong et al., "Tracking a Detected Face With Dynamic Programming", Jun. 1, 2006, pp. 573-580.
Wu Bo et al., "Fast Rotation Invariant Multi-View face Detection Based on Real Adaboost", May 17, 2004, pp. 79-84.
Hongliang Bai et al., "Motion and Haar-like Features Based Vehicle Detection", Jan. 4, 2006, pp. 356-359.
Rainer Lienhart et al., "An Extended Set of Harr-like Features for Rapid Object Detection", Sep. 22, 2002, pp. I-900-I-903.
Japanese Office Action dated Oct. 4, 2011 for corresponding Japanese Application No. 2008-000708.

* cited by examiner

FIG. 2

| DETERMINATION PATTERN INFORMATION | | WEIGHTING FACTOR | DETERMINATION TARGET |
|---|---|---|---|
| TYPE | POSITION/SIZE | | |
| A | $x_{11}, y_{11}, x_{12}, y_{12}$ | $\alpha_1$ | FACE DIRECTION-HIERARCHY 1 |
| B | $x_{21}, y_{21}, x_{22}, y_{22}$ | $\alpha_2$ | FACE DIRECTION-HIERARCHY 1 |
| C | $x_{31}, y_{31}, x_{32}, y_{32}$ | $\alpha_3$ | FACE DIRECTION-HIERARCHY 1 |
| ⋮ | ⋮ | ⋮ | ⋮ |
| D | $x_{41}, y_{41}, x_{42}, y_{42}$ | $\alpha_4$ | FACE DIRECTION-HIERARCHY 2 |
| A | $x_{51}, y_{51}, x_{52}, y_{52}$ | $\alpha_5$ | FACE DIRECTION-HIERARCHY 2 |
| ⋮ | ⋮ | ⋮ | ⋮ |
| B | $x_{61}, y_{61}, x_{62}, y_{62}$ | $\alpha_6$ | FACE AREA-HIERARCHY 1 |
| ⋮ | ⋮ | ⋮ | ⋮ |
| A | $x_{71}, y_{71}, x_{72}, y_{72}$ | $\alpha_7$ | FACE AREA-HIERARCHY 2 |
| ⋮ | ⋮ | ⋮ | ⋮ |
| C | $x_{81}, y_{81}, x_{82}, y_{82}$ | $\alpha_8$ | FACE AREA-HIERARCHY n |
| ⋮ | ⋮ | ⋮ | ⋮ |

FIG. 6
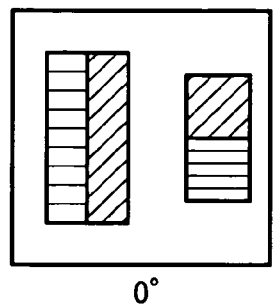
0°
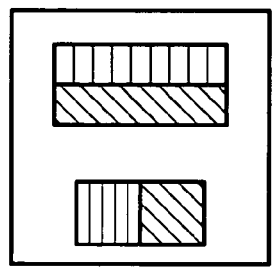
90° ROTATION
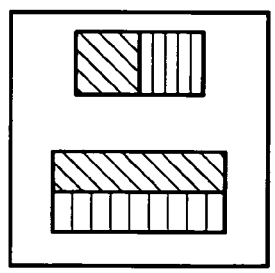
-90° ROTATION
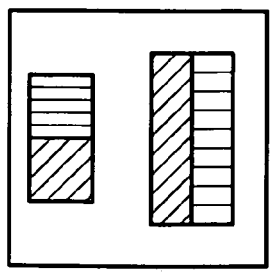
180° ROTATION

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority documents 2007-073455 filed in Japan on Mar. 20, 2007 and 2008-000708 filed in Japan on Jan. 7, 2008.

BACKGROUND OF THE INVENTION

1. Field of the Invention

The present invention relates to an image processing apparatus, an image processing method, and a computer program product.

2. Description of the Related Art

For digital still cameras (hereinafter, "digital camera"), there is a known conventional technology to determine a face area from an image to be captured and automatically focus the digital camera on the face area. However, such conventional technology requires a long processing time because a face area is determined by cutting out an image of a certain area from an image to be processed and matching various templates with the cut-out image. That is, a number of times of matching operation is required.

For example, Japanese Patent Application Laid-open No. 2004-334836 discloses an conventional image processing apparatus that reduces the processing time by setting the upper and lower limits of the size of an image to be cut out of an image to be processed.

However, the conventional image processing apparatus has to measure a distance to an object before determining an image area. Thus, when a distance to an object other than a person, for example, background is measured, the upper and lower limits of the size of an image to be cut out cannot appropriately be set. Therefore, the processing time cannot be reduced.

Moreover, it is not possible to determine which direction of an image to be processed is downward, i.e., which direction of an image is a direction in which a person's face is upright. Therefore, templates are prepared for four directions of the image to determine a face area, which does not allow reduction in the processing time.

SUMMARY OF THE INVENTION

It is an object of the present invention to at least partially solve the problems in the conventional technology.

According to an aspect of the present invention, there is provided an image processing apparatus that detects a face area from image information. The image processing apparatus includes a storage unit that stores therein a determination pattern to detect a face area from image information; a determining unit that determines a face direction in which a face image in the image information is upright based on the determination pattern; and a detecting unit that matches direction of the image information with direction of the determination pattern based on the face direction, and detects a face area from the image information.

According to another aspect of the present invention, there is provided an image processing method for detecting a face area from image information. The image processing method includes storing, in a storage unit, a determination pattern to detect a face area from image information; determining a face direction in which a face image in the image information is upright based on the determination pattern; matching direction of the image information with direction of the determination pattern based on the face direction; and detecting a face area from the image information.

According to still another aspect of the present invention, there is provided a computer program product that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a data structure of a pattern database;

FIG. 6 is a schematic diagram for explaining arrangements of a determination pattern corresponding to four directions;

DETAILED DESCRIPTION OF THE PREFERRED EMBODIMENTS

Exemplary embodiments of the present invention are explained in detail below with reference to the accompanying drawings.

Described below is a first embodiment of the present invention. An image processing apparatus of the first embodiment is explained as, for example, a digital camera including a face determining processor that determines a face direction from image information and detects a face area based on the face direction.

Figure 1:
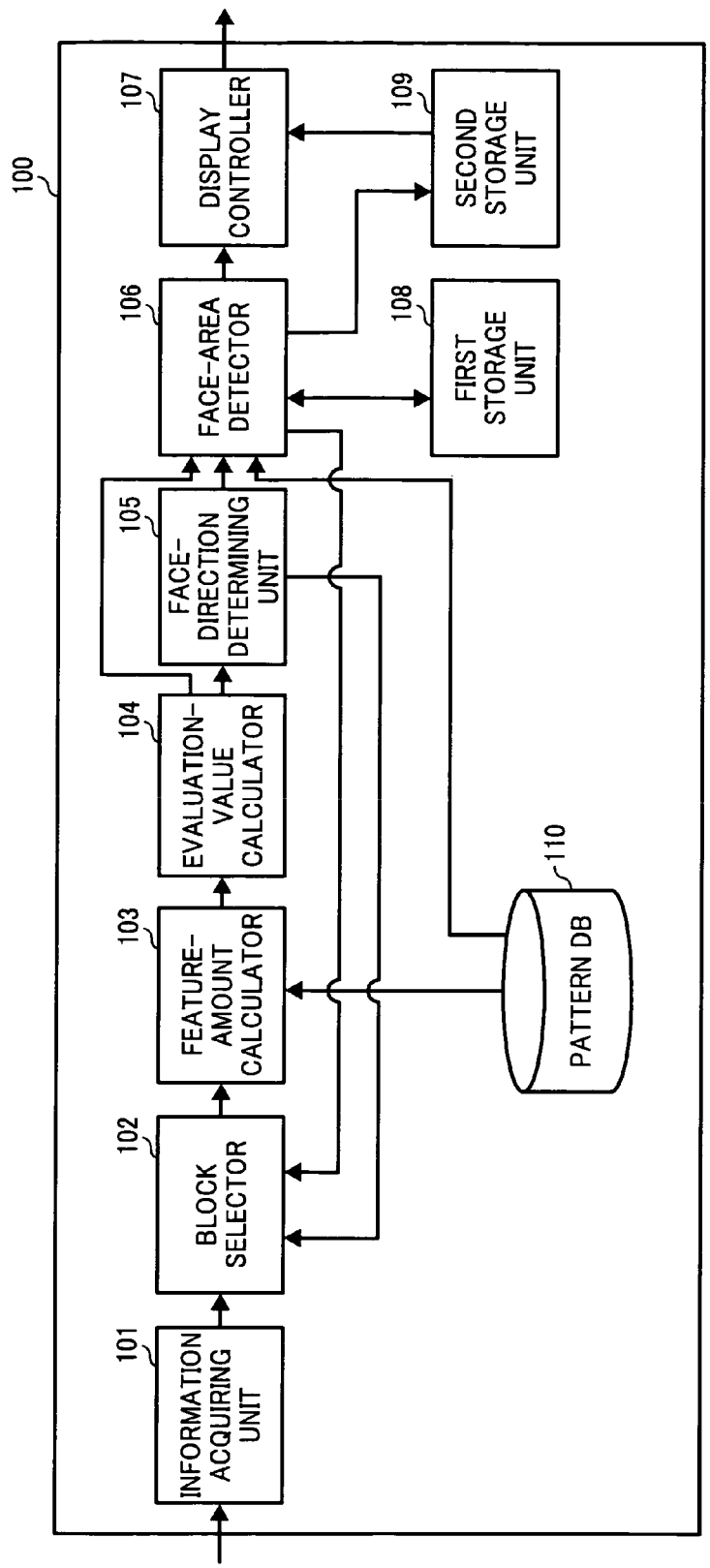
FIG. 1 is a block diagram of a face determining processor of an image processing apparatus according to a first embodiment of the present invention.

FIG. 1 is a block diagram of a face determining processor 100 of an image processing apparatus according to the first embodiment. The face determining processor 100 includes an information acquiring unit 101, a block selector 102, a feature-amount calculator 103, an evaluation-value calculator 104, a face-direction determining unit 105, a face-area detector 106, a display controller 107, a first storage unit 108, a second storage unit 109, and a pattern database (DB) 110.

The information acquiring unit 101 acquires image information from a temporary storage memory that stores the image information input through a charge-coupled device (CCD) and converted thereto. It is noted that image information may be acquired from an external storage medium such as a nonvolatile storage medium.

The block selector 102 selects a block used to determine a face direction and to detect a face in the acquired image information (hereinafter, also "target block"). The block is explained above as a rectangle; however, it is not limited to the rectangle, and can be simply any one of closed areas in various shapes.

The pattern DB 110 stores therein information to detect a face area from the image information. More specifically, the pattern DB 110 stores therein determination pattern information, weighting factors, and determination targets in association with one another. FIG. 2 is an example of a data structure of the pattern DB 110. The pattern DB 110 stores therein types and positions/sizes of determination patterns as the determination pattern information. The determination target indicates a processing type and hierarchy using a determination pattern, and the processing type indicates either one of a "face-direction" determining process and a "face-area" detecting process. If each of the processing types has hierarchies, then the pattern DB 110 also stores therein a hierarchical type such as "hierarchy 1".

The "determination pattern" mentioned here indicates a pattern to calculate a feature amount of image information, and the "determination pattern information" mentioned here indicates information indicating an attribute of a determination pattern. More specifically, the determination pattern indicates an area used to calculate a sum of pixel values in image information as a determination target, and the area is specified by the determination pattern information, and thus the determination pattern is used to calculate a feature amount of the image information by using a sum of pixel values of pixels included in the area.

Figure 3:
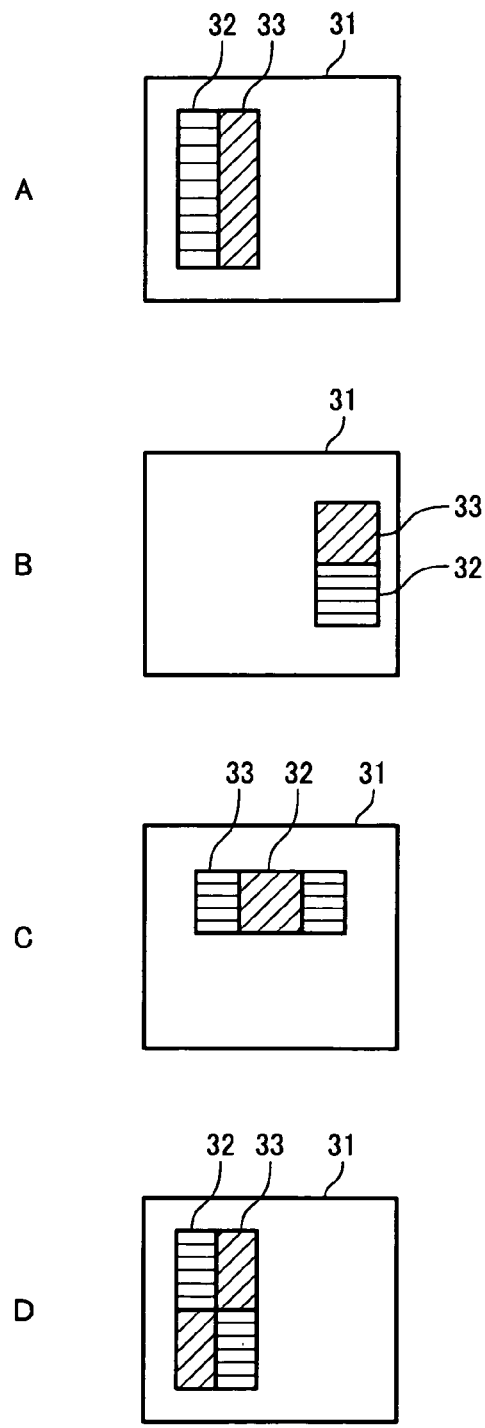
FIG. 3 is a schematic diagram for explaining types of a determination pattern.

FIG. 3 is a schematic diagram for explaining an example of associating determination patterns with types of the determination patterns. The association is also stored in the pattern DB 110. FIG. 3 depicts four types of determination patterns "A", "B", "C", and "D"; however, the number of types are not limited to four. The determination pattern information is obtained by reading and learning a considerably large number of pieces of image information for person's faces and of image information for non-person's face, and deciding a determination pattern and its position/size which are effective in determination of a person's face. The obtained determination pattern information is previously stored in the pattern DB 110.

It is noted that the determination patterns are defined as "direction determination pattern" and "face determination pattern" according to a processing type to be used. Furthermore, there is no need to limit the information to the image information for person's faces, and thus, image information for faces of animals such as dogs and cats and image information for non-animal's face may be read to decide a determination pattern. Even if the image information indicates the person's face, a determination pattern may be decided according to his/her smile or age.

As shown in the determination patterns A to D of FIG. 3, each determination pattern indicates a relative positional relationship between an area (lateral line area) 32 where pixel values are added to a block 31 which is an area where a face direction in the image information is determined and an area (diagonal line area) 33 where pixel values are added thereto. The determination patterns are used for various processes by enlarging or reducing the determination pattern corresponding to the size of a target block. Therefore, there is no need to prepare determination patterns for each size of a block selected by the block selector 102. The target block is normalized and a determination pattern is applied thereto, and thus, the processing time becomes constant even if the sizes of blocks are different from each other.

As shown in FIG. 3, the shapes of the area 32 and the area 33 are specified depending on the type of the determination pattern, and a relative position and size of the areas 32 and 33 in the block 31 are specified by coordinates indicated at the position/size. Stored coordinates are different depending on the position/size even if the types of the determination patterns are the same as each other, which makes the determination patterns different from each other.

The hierarchy is a classification corresponding to a level of determination of a determination pattern used to determine a face direction or a face area. Determination patterns with a small amount of calculation required for the determining process belong to a higher hierarchy, and the amount of calculation required for the determining process increases as the hierarchy is lower. In other words, a lower hierarchy includes patterns for the determining process required for more detail than that of the determination patterns belonging to the higher hierarchy. The face-direction determining process is performed by using determination patterns stored in each hierarchy from higher to lower ones. When the face direction can be determined by using the determination pattern in the higher hierarchy, the determination of the face direction is finished without using the determination pattern in the lower hierarchy, which allows reduction in the processing time.

More specifically, a determination pattern to extract rough features of a person's face is used in the determining process using the higher hierarchy, while a determination pattern to extract detailed features of the person's face is used in the determining process using the lower hierarchy. By using these determination patterns, it is possible to effectively exclude the block which is not the face area in the higher hierarchy, and the processing time can thereby be reduced.

In the face-area detecting process, determination patterns are also stored for each hierarchy, and it is determined whether a target block is a face area by using the determination pattern for each hierarchy. In the face-area detecting process, a target block which is determined as non-face area (target block where the face area is not detected) in the higher hierarchy is not set as a determination target in the lower hierarchy, but only the block determined as the face area is set as a target for the face detecting process by using the determination pattern belonging to the lower hierarchy. The details thereof are explained later.

The feature-amount calculator 103 calculates a feature amount of a target block selected by the block selector 102 using a determination pattern which is stored in the pattern DB 110 and is used for determining a face direction. A method of calculating a feature amount is explained below. For example, in the case of the determination pattern A of FIG. 3, sums of pixel values of pixels included in the area 32 and in the area 33 of the image information located in the target block (block image) are calculated respectively. The sum of the pixel values in the area 33 is subtracted from the sum of the pixel values in the area 32 to obtain a value, and the value is set as a feature amount of an image as a processing target. The feature-amount calculator 103 calculates a feature amount of image information for the target block by using one or more of determination patterns stored in the pattern DB 110. Furthermore, the feature-amount calculator 103 rotates the determination pattern in four directions to calculate feature amounts thereof in the four directions.

The evaluation-value calculator 104 calculates respective evaluation values of the target block in the four directions from the calculated feature amounts for the four directions. A method of calculating the evaluation values is explained below. The method is implemented by multiplying a calculated feature amount of each determination pattern by a weighting factor corresponding to the determination pattern to total the calculated values. The total value is determined as an evaluation value for the target block. The evaluation value can be calculated by Equation (1):

$$f(x) = \sum_{t=1}^{T} \alpha_t h_t(x) \quad (1)$$

where ht is a feature amount of a determination pattern t, αt is a weighting factor corresponding to the determination pattern t, t is the number of determination patterns, and f(x) is an evaluation value of a target block x.

The face-direction determining unit 105 determines a direction in which a face image in image information is upright, i.e., properly positioned, from the respectively calculated evaluation values for the four directions. More specifically, the face-direction determining unit 105 determines a direction in which an evaluation value calculated by the evaluation-value calculator 104 exceeds a predetermined threshold, as a direction in which a face image in image information is upright. It is noted that the face-direction determining unit 105 can determine a face direction using a feature amount instead of the evaluation values for the four directions.

The face-area detector 106 detects a face area indicating the area of a face image from image information assuming that the image information is upright in the face direction determined by the face-direction determining unit 105. More specifically, the face-area detector 106 calculates an evaluation value of the target block. When the calculated evaluation value is equal to the threshold or less, it is determined that the target block is not the face area. The face-area detector 106 determines one target block using a determination pattern corresponding to each hierarchy from the highest to the lowest, and detects an area determined as the face area even in the lowest hierarchy, as a final face area.

When it is determined that the area is not the face area in the higher hierarchy, the area is not subjected to the face detecting process using the determination pattern that belongs to the lower hierarchy, and only the target block determined as the face area in the higher hierarchy is set as a target for the face detecting process using the determination pattern belonging to the lower hierarchy. Accordingly, the processing time required for face detection can be reduced. The face-area detector 106 performs the face detecting process on target blocks selected in descending order from a large size to a small size by the block selector 102. Therefore, the processing speed can be increased more than that of the case where the determination is started from a small-sized block.

The display controller 107 displays a face frame indicating a face area in an image displayed on a display unit when the face area is detected from the target block by the face-area detector 106.

The first storage unit 108 stores therein position information for an area determined as a non-face area when the face area is not detected from the target block in the face-area detector 106. When the face area is to be determined in the face-area determining process using the determination pattern in the lower hierarchy, the processing time for determination can be reduced by storing the position information for the non-face area and excluding the area from the determination target.

The second storage unit 109 stores therein an area where the face area is detected by the face-area detector 106. More specifically, when the face-area detector 106 changes the size of the target block and further determines whether an area is the face area, the area having already been determined as the face area is not targeted for determination, and thus the second storage unit 109 stores therein the determined face area. Consequently, it is possible to prevent overlapping of face-area determining processes and reduce the processing time for the face-area detecting process.

Figure 4:
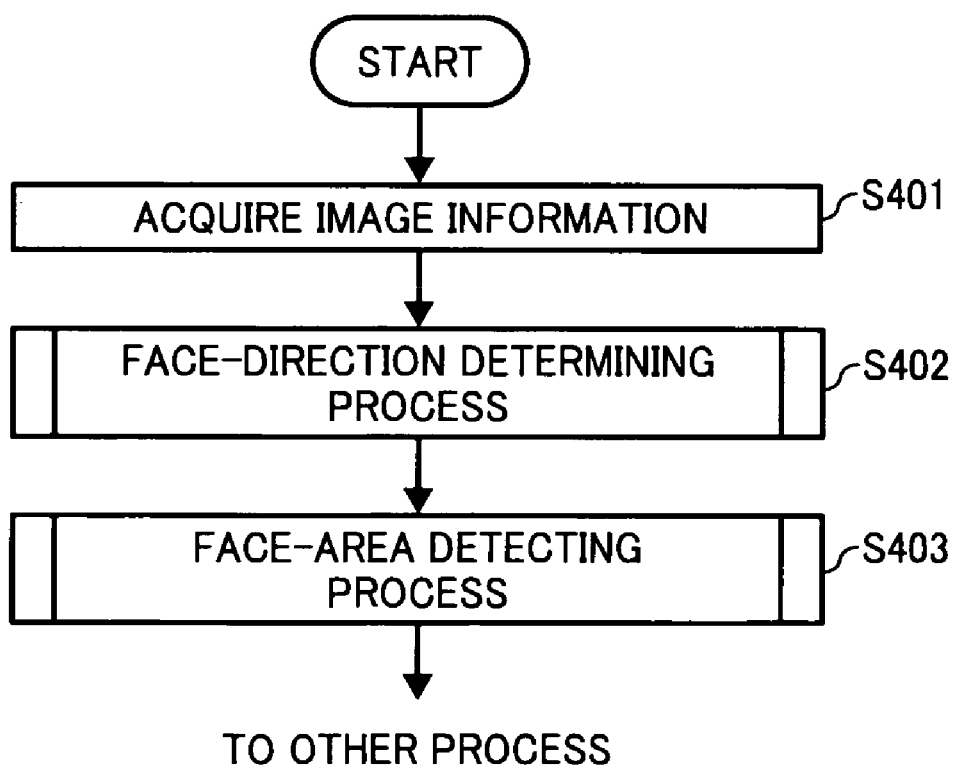
FIG. 4 is a flowchart of a face determining process performed by the face determining processor.

FIG. 4 is a flowchart of a face determining process performed by the face determining processor 100, i.e., the information acquiring unit 101, the face-direction determining unit 105, and the face-area detector 106.

At first, the information acquiring unit 101 acquires image information (step S401). Then, the face-direction determining unit 105 performs the face-direction determining process (step S402). The face-direction determining process is explained in detail later. The face-area detector 106 performs the face-area detecting process based on the face direction determined by the face-direction determining unit 105 as an upright direction of the image information (step S403). The face-area detecting process is explained in detail later. Other processes are executed to the image information subjected to the face-area detecting process. The other processes mentioned here include a focus adjustment process by measuring a distance to a subject in the face area and a face-color correcting process for adjusting white balance of the face area.

As explained above, the face direction in image information is determined first, and then the face area is detected. Because of this, the face area is simply detected only in one of four directions of the image information. Therefore, the time required for the face determining process can be reduced.

Figure 5:
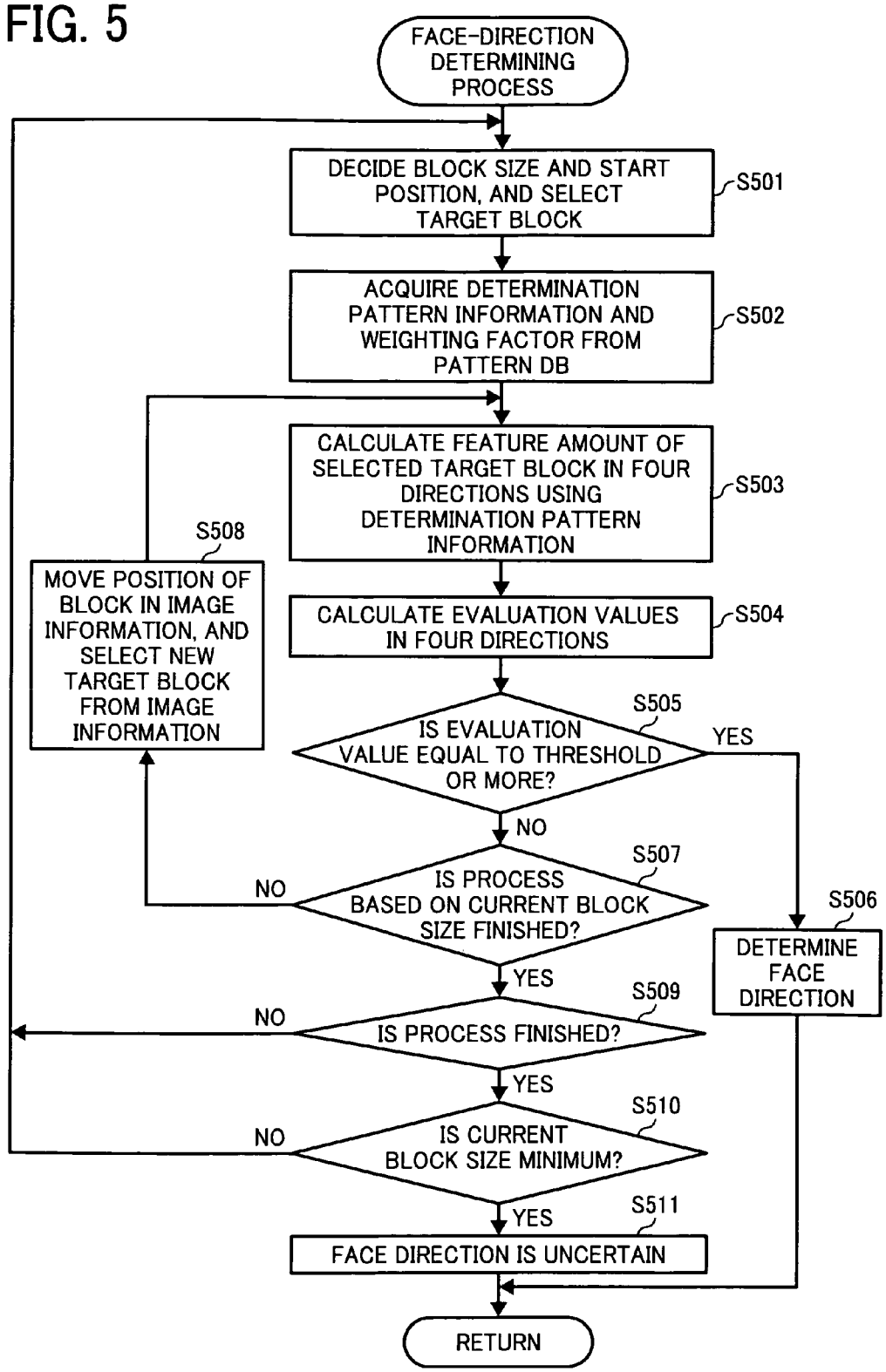
FIG. 5 is a detailed flowchart of a face-direction determining process shown in FIG. 4.

FIG. 5 is a detailed flowchart of the face-direction determining process shown in FIG. 4.

At first, the block selector 102 decides the size of a block as a determination target and a determination-start position in image information, and selects a target block (area image information) from the image information (step S501). In this example, the block selector 102 selects the largest block as the target block, and then selects images from the next largest to the smaller one by one. Consequently, if the face direction can be determined in a larger area, then there is no need to determine the face direction in other sizes, which reduces the time taken for determination of the face direction. As for the determination-start position, if there is a position including an area where the face direction is more easily determined (e.g., an area including the center of the image information), the determination-start position can be determined from the image information for the position, which also reduces the time for determination.

Next, the block selector 102 acquires determination pattern information based on which a determination target is subjected to the face-direction determining process and also acquires a weighting factor from the pattern DB 110 (step S502). If the face-direction determining process is performed by using a determination pattern for each hierarchy, the block selector 102 acquires determination pattern information corresponding to the higher hierarchy and a weighting factor.

The feature-amount calculator 103 calculates feature amounts of the selected target block in the four directions using the determination pattern information (step S503). One or more determination patterns to determine the face direction are applied to the area image information, and each feature amount of the determination patterns is calculated from a sum of pixel values included in each area where pixel values are added. The feature amounts for the four directions are calculated by using determination patterns for a target block. Specifically, one of the determination patterns is acquired from the pattern DB 110, and the other ones are obtained by rotating the acquired determination pattern in three directions.

FIG. 6 is a schematic diagram for explaining an example of arrangements of a determination pattern corresponding to the four directions, respectively. In an example of FIG. 6, the determination pattern is arranged in the four directions of the target block at each angle such as 0 degree, 90 degrees, −90 degree, and 180 degrees, respectively. Two determination patterns are shown in the target block of FIG. 6 for easy understanding; however, the number of determination patterns can be arbitrarily set, and areas, of a plurality of determination patterns, where each sum of pixel values is calculated can overlap each other. As explained above, by rotating the determination pattern in the three directions, there is no need to calculate coordinates of the determination pattern rotated in the four directions, respectively, and store the calculated coordinates, and thus, a large memory capacity is not required.

The evaluation-value calculator 104 calculates evaluation values for the four directions, respectively. Specifically, the evaluation value is a sum of values each obtained by multiplying each feature amount calculated for the respective determination patterns by a weighting factor corresponding to each of the determination patterns (step S504). The face-direction determining unit 105 determines whether the calculated evaluation value is a predetermined threshold or more (step S505). Comparison is made here between an evaluation value of one target block and the threshold. However, to further improve determination accuracy, it can be determined after a total of evaluation values of a plurality of target blocks or of all target blocks selectable by the image information are calculated. The threshold is obtained by previously reading image information on faces and non-face image information so that the face-direction determining unit 105 can learn the image information beforehand.

When any one of the evaluation values for the four directions is equal to the threshold or more (YES at step S505), the face-direction determining unit 105 determines, as the face direction, the direction in which the evaluation value is equal to the threshold or more (step S506), and the face-direction determining process ends. When no evaluation values for the four directions are the threshold or more (NO at step S505), the face-direction determining unit 105 determines whether the evaluation based on the current block size is finished (step S507). More specifically, the face-direction determining unit 105 calculates all the evaluation values of the target block to be evaluated based on the current block size, and determines whether the comparison is made with the threshold. When the evaluation based on the current block size is not finished (NO at step S507), the block selector 102 moves the position of the block in the image information and selects a new target block from the image information (step S508). It is noted that the new target block can partially overlap the already selected target block.

When the evaluation based on the current block size is finished (YES at step S507), the face-direction determining unit 105 determines whether the face-direction determining process for the image information is finished (step S509). More specifically, when the face-direction determining process is performed by using determination patterns for a plurality of hierarchies, the face-direction determining unit 105 determines whether the process is performed in all the hierarchies. When the face-direction determining process for the image information is not finished (NO at step S509), the process control returns to step S501 to perform a series of the face-direction determining processes by using a determination pattern for the lower hierarchy.

On the other hand, when the face-direction determining process for the image information is finished (YES at step S509), the face-direction determining unit 105 determines whether the size of the current block is the minimum (step S510). When the size of the current block is not the minimum (NO at step S510), the process control returns to step S501 to select a target block based on a new block size. When the size of the current block is the minimum (YES at step S510), the face-direction determining unit 105 determines that the face direction is uncertain or is impossible to be determined (step S511), and the face-direction determining process ends.

The evaluation values are calculated in the hierarchies during the face-direction determining process in the first embodiment. However, the face direction can be determined not using the determination patterns in the hierarchies, but determined by calculating an evaluation value using one hierarchy, i.e., a set of determination patterns.

Figure 7A:
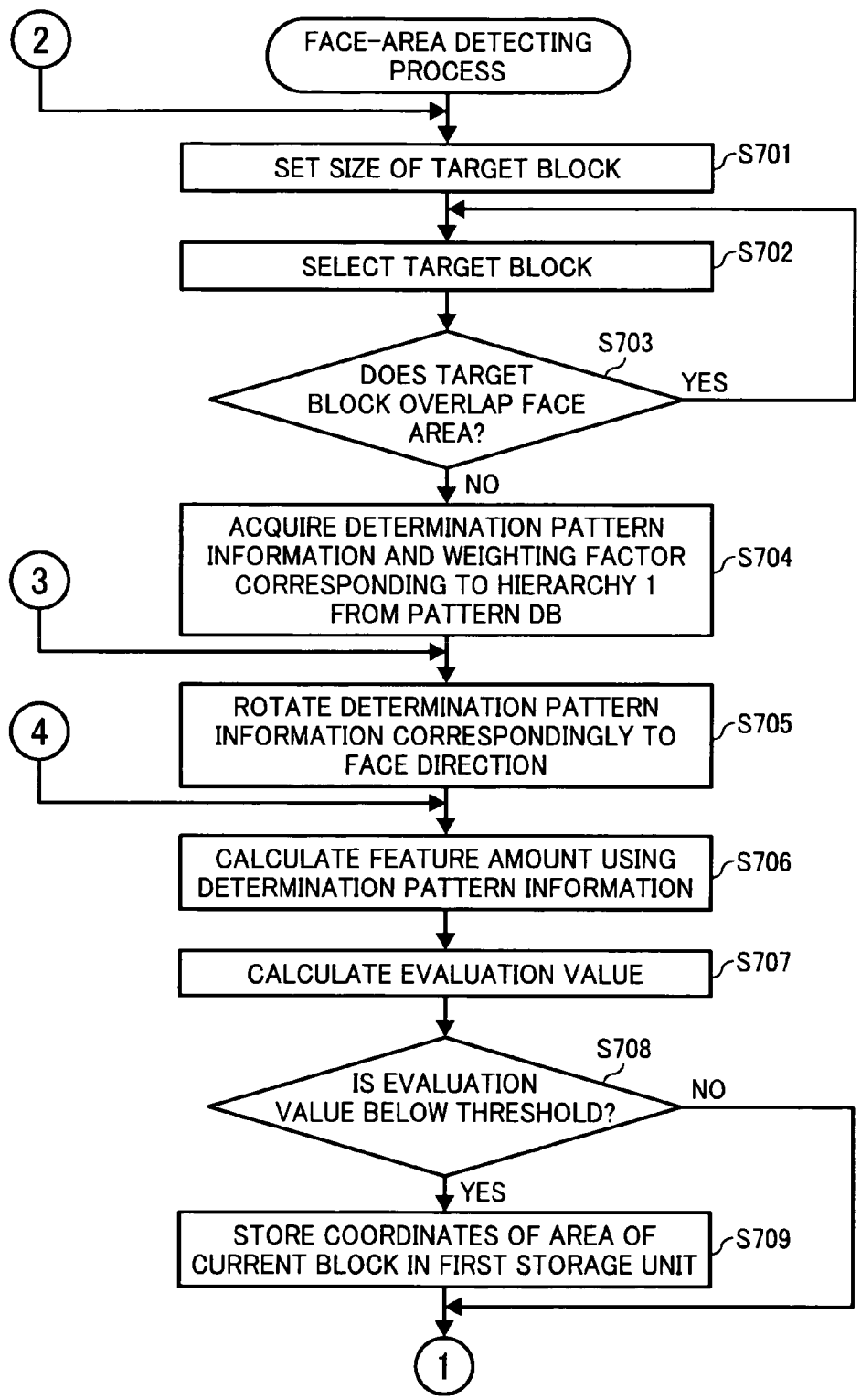
FIGS. 7A and 7B are flowcharts of a face-area detecting process shown in FIG. 4.
Figure 7B:
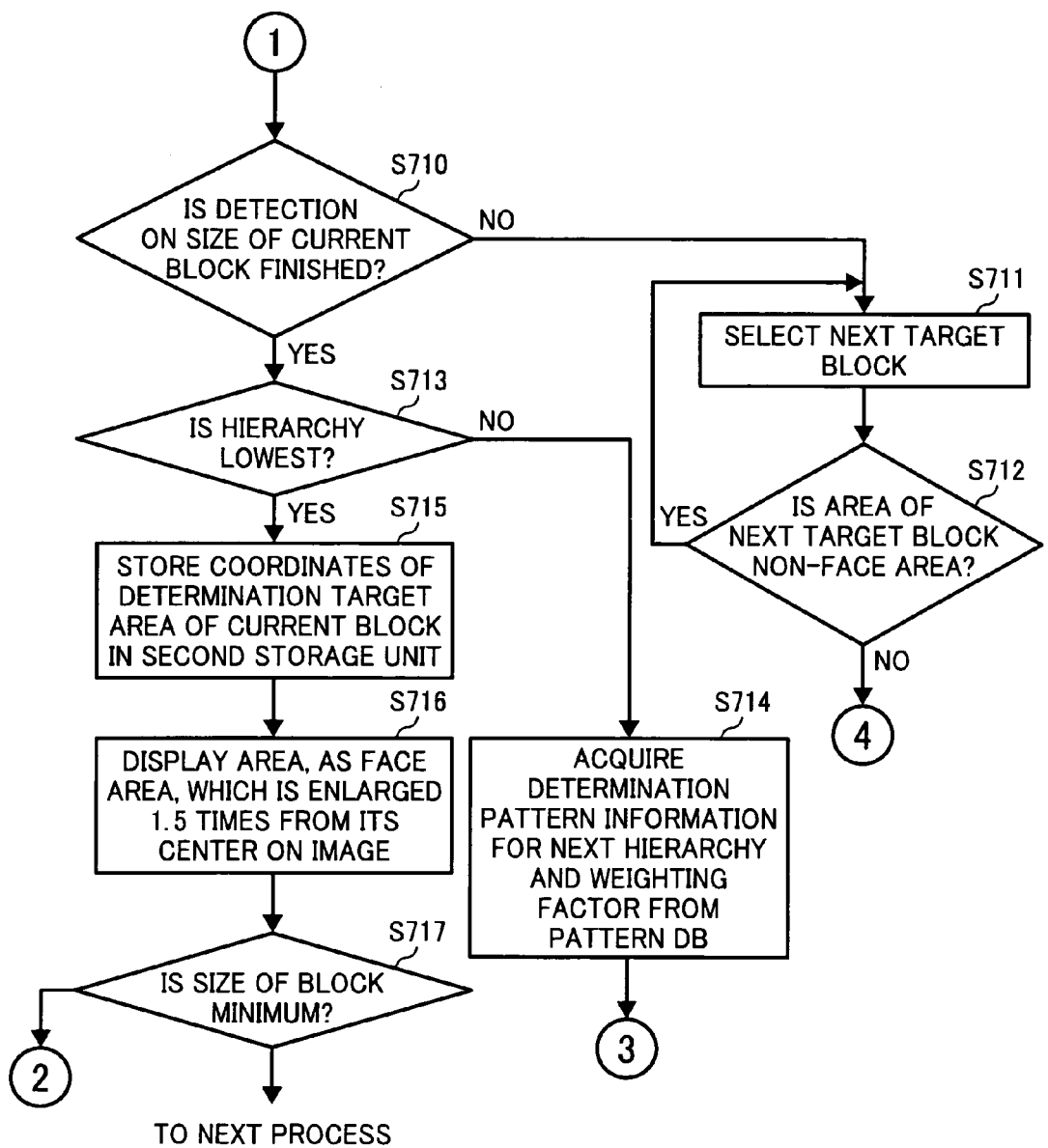

FIGS. 7A and 7B are detailed flowcharts of the face-area detecting process shown in FIG. 4.

At first, the block selector 102 sets the size of a target block (step S701). The size of the block as a determination target is initially set to the maximum size, and then set to smaller sizes gradually. Consequently, similarly to the face-direction determining process, if a face area can be detected in a large area, there is no need to perform the face-area detecting process in any other area of a smaller size. Thus, a face area can be detected in a shorter time. The block selector 102 selects a target block from image information (step S702).

Figure 8:
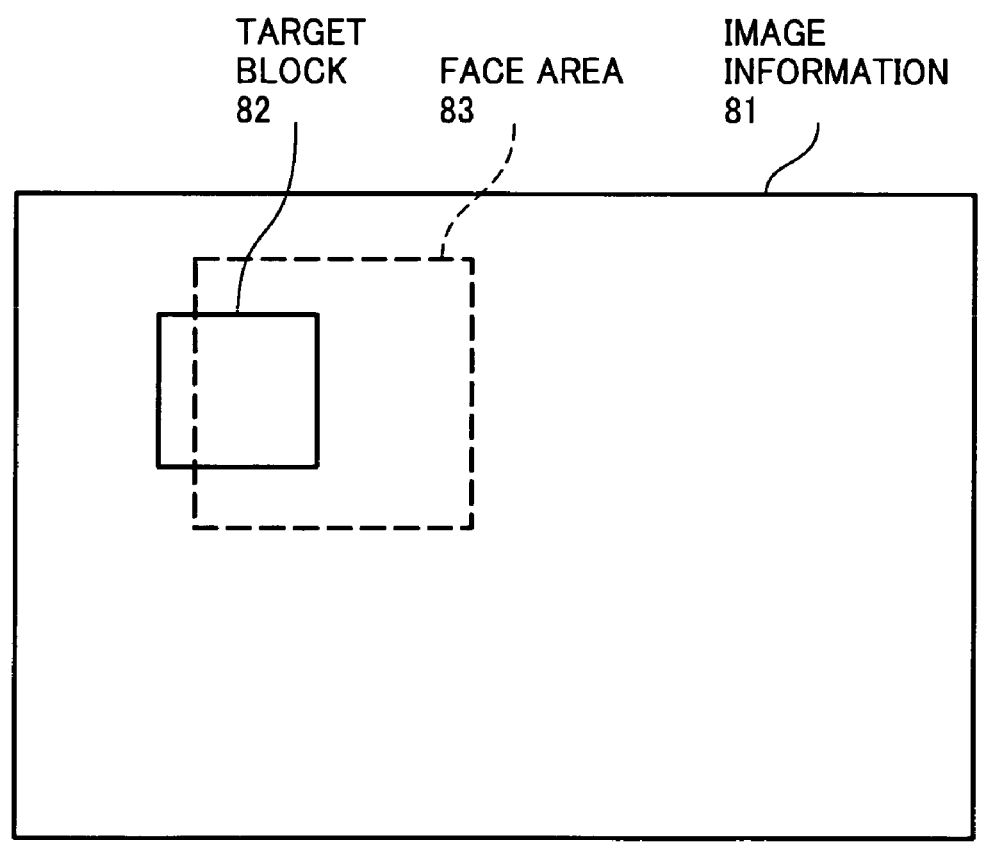
FIG. 8 is a schematic diagram for explaining an example of a relationship among image information, a target block, and a face area.

The block selector 102 determines whether the selected target block overlaps a face area already detected (step S703). More specifically, the block selector 102 determines whether the area of the selected target block overlaps the face area stored in the second storage unit 109. The overlap of the areas mentioned here indicates cases where the entire target block is included in a face area and where part of the target block, for example, a predetermined threshold (e.g., ½ or ¾) or more thereof overlaps a face area. FIG. 8 is a schematic diagram for explaining an example of a relationship among the entire image information, a target block, and a face area.

As shown in FIG. 8, when an area 83 where a face area is already detected is included in image information 81, and when a newly selected target block 82 overlaps half or more of the area 83, the target block 82 is not used for determination, but a new target block located at another position is selected. As explained above, an area in which a face area is already detected is not set as a target block, and thus unnecessary face-area determining process is not executed, which reduces the processing load and the processing time.

When the selected target block overlaps an area already detected as a face area (YES at step S703), the process control returns to step S702 to select a new target block. On the other hand, when the selected target block does not overlap a face area (NO at step S703), the feature-amount calculator 103 acquires, from the pattern DB 110, a weighting factor and determination pattern information corresponding to hierarchy 1 used to determine the face area (step S704). The feature-amount calculator 103 rotates the determination pattern indicated by the determination pattern information correspondingly to the face direction determined in the face-direction determining process (step S705). The feature-amount calculator 103 calculates feature amounts using the determination pattern information (step S706). The feature amounts are calculated in the same manner as previously explained for the face-direction determining process, and thus the same explanation is not repeated.

The evaluation-value calculator 104 calculates an evaluation value by multiplying each feature amount calculated for each determination pattern by a weighting factor corresponding to the determination pattern (step S707). The evaluation value is also calculated in the same manner as previously explained for the face-direction determining process, and thus the same explanation is not repeated. The face-area detector 106 determines whether the evaluation value is less than a threshold (step S708). Similarly to the face-direction determining process, the threshold is obtained by previously reading image information for person's faces and image information for non-person's face so that the face-area detector 106 can learn the image information beforehand. When the evaluation value is less than the threshold (YES at step S708), the coordinates of the area of a current block are stored in the first storage unit 108 (step S709).

The image information for the block is determined as non-face area, and thus the block is not set as a target for determination of whether it is the face area in the lower hierarchy. In other words, the face-area determining process is not performed unnecessarily, which reduces the processing load and the processing time. On the other hand, when the evaluation value is not less than the threshold, i.e., the evaluation value is equal to the threshold or more (NO at step S708), the process control proceeds to step S710.

The face-area detector 106 determines whether the face-area detecting process on the size of the current block is finished (step S710). That is, the face-area detector 106 determines whether it is finished to select blocks of a size of the current block from the entire area of the image information. When the face-area detecting process on the size of the current block is not finished (NO at step S710), the block selector 102 selects a block as a next determination target from the image information (step S711). The block selected at step S711 can be an area that partially overlaps the previously selected block. The block selector 102 determines whether the area of the next target block is the non-face area stored in the first storage unit 108 (step S712).

When the area of the next target block is the non-face area (YES at step S712), the process control returns to step S711 to select a next target block. When the area of the next target block is not the non-face area (NO at step S712), the process control returns to step S706 to calculate an evaluation value for the new target block. In this manner, upon determination of the face area in the image information, when the area in the target block of the same size is determined as the non-face area by using the determination pattern for a hierarchy, the face-area determination is not performed on the area in the lower hierarchy. The target block is thereby limited, which reduces the processing load and the processing time.

At step S710, when the face-area detecting process on the size of the current block is finished (YES at step S710), the face-area detector 106 further determines whether the hierarchy of the determination pattern is the lowest (step S713). More specifically, the face-area detector 106 determines whether the hierarchy of the current determination pattern is the lowest hierarchy of the determination patterns used to determine the face area stored in the pattern DB 110. To be more specific, if, for example, 10-hierarchy determination patterns are stored in the pattern DB 110, then it is determined whether the hierarchy of the current determination pattern is hierarchy 10.

When the hierarchy of the determination pattern is not the lowest (NO at step S713), the face-area detector 106 acquires a weighting factor and determination pattern information for the next hierarchy from the pattern DB 110 (step S714). Thereafter, the process control returns to step S705 to calculate the feature amount by using the acquired determination pattern information. When the hierarchy of the determination pattern is the lowest (YES at step S713), the face-area detector 106 stores the coordinates of the area of the current target block in the second storage unit 109 (step S715). More specifically, if the evaluation value for the target block calculated by using the determination patterns for the hierarchy 1 to the lowest hierarchy is not less than the threshold, then the target block is determined as the face area. Next, the display controller 107 displays an area, as a face area, which is enlarged 1.5 times from the center thereof, on the image displayed on the display unit (step S716).

Figure 9A:
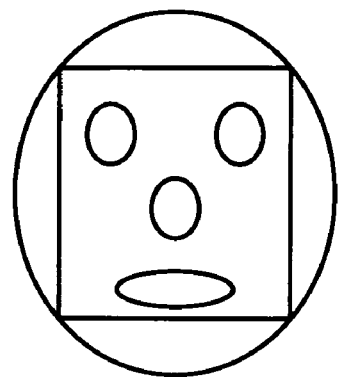
FIGS. 9A and 9B are examples of display of a face area.
Figure 9B:
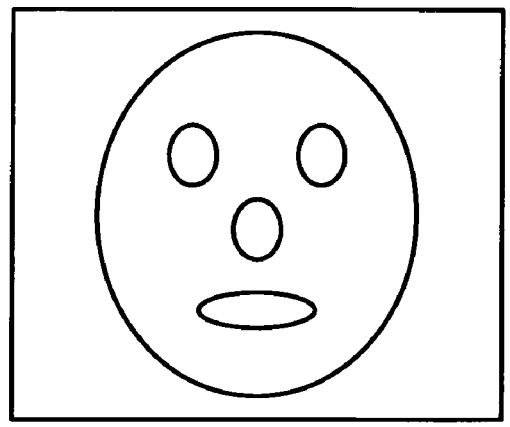

FIGS. 9A and 9B are schematic diagrams for explaining examples of display of the face area. As shown in FIG. 9A, if an area, i.e., a target block used to determine the face area, is displayed as it is as a face area, it is unnatural because the face area does not include the face line, and the user may feel strange when the face is recognized. On the other hand, as shown in FIG. 9B, if the face area is enlarged 1.5 times from the original one, the entire face is displayed as the face area. With the enlargement, a frame displaying the face becomes more natural, and thus the strange feeling can be resolved. It is noted that the magnification to enlarge the face area is not limited to 1.5 times, and an optimal value is selected according to the determination pattern or the like.

Next, the face-area detector 106 determines whether the size of the target block is the minimum (step S717). The size of a target block of the face area is made gradually smaller from the maximum size, and a determination target of the minimum size is selected from the image information. Therefore, when the size of the block is the minimum, it is determined that the face-area determining process on the image information is finished. When the size of the target block is the minimum (YES at step S717), the face-area detector 106 performs the next process such as a focus adjustment process by measuring a distance to, for example, the face area, and a white-balance adjustment process for the face area. When the size of the target block is not the minimum (NO at step S717), the process control returns to step S701 to set the size of a new block to perform the face-area determining process.

The determination patterns to determine a different face area for each hierarchy are used in the above manner, and an area of which evaluation value is less than the threshold is excluded, and then it is determined whether the area is the face area. Thus, the face area can be quickly detected without performing any unnecessary process.

In the face-direction determining process and the face-area detecting process of the first embodiment, the case is explained where the determination pattern is rotated in the four directions and obtained values are applied to the area image information. However, the feature amount can be calculated by applying the determination patterns obtained by rotating the image information in the four directions. That is, only the image information is rotated, which reduces the processing time.

In addition, the case is explained where the direction and area of a person's face are determined with respect to four directions. However, the number of directions is not limited to four. For example, the direction and area of a person's face can be determined with respect to a plurality of directions at arbitrary angles, for example, three directions of acquired image information at 0 degree, 90 degrees, and −90 degree.

Figure 10:
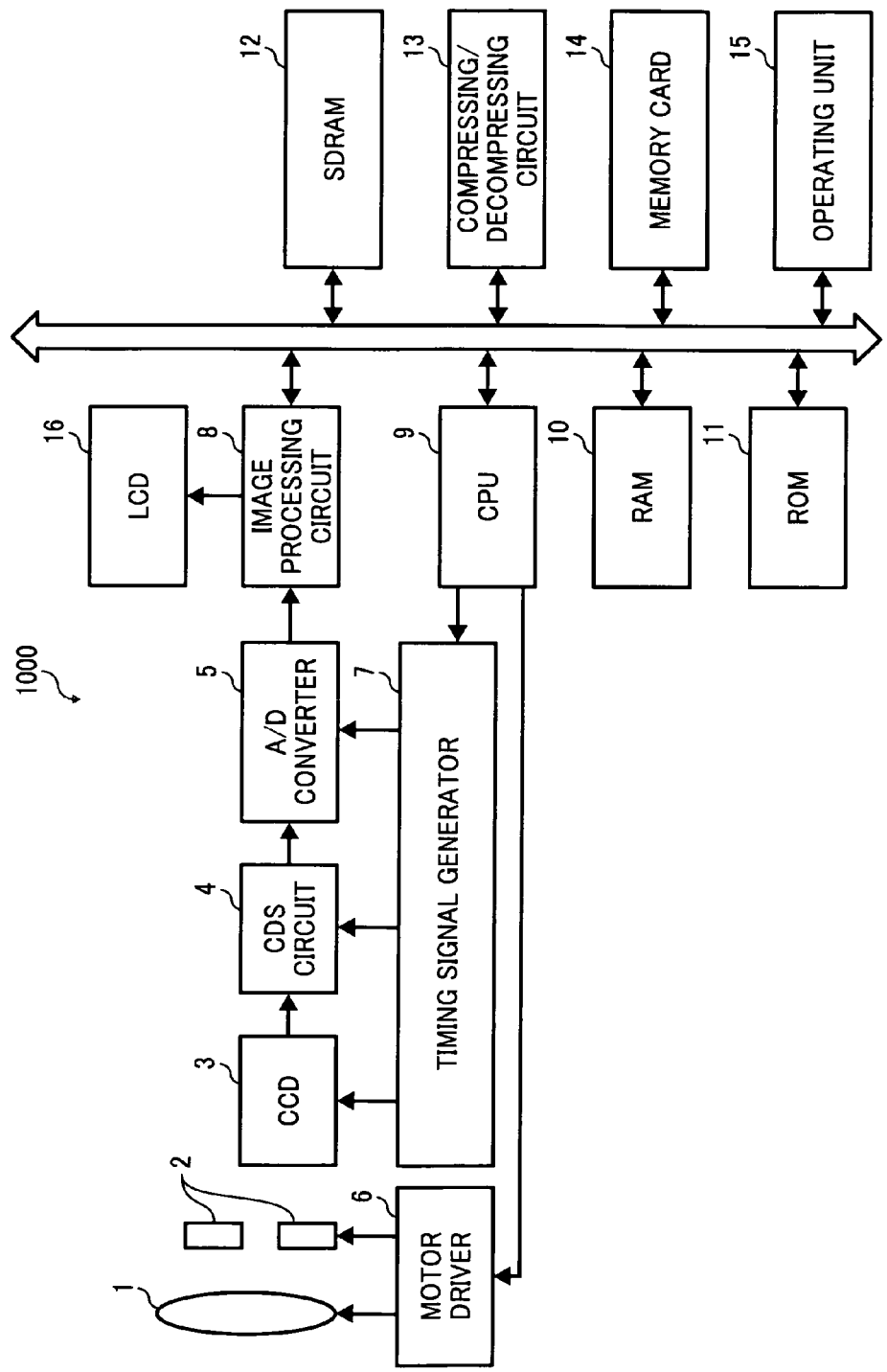
FIG. 10 is a block diagram of a hardware configuration of the image processing apparatus according to the first embodiment.

FIG. 10 is a block diagram of a hardware configuration of a digital camera 1000 as an image processing apparatus according to the first embodiment. Object light first passes through a photographic optical system 1 and is then incident on a charge-coupled device (CCD) 3. A mechanical shutter 2 is disposed between the photographic optical system 1 and the CCD 3, and the mechanical shutter 2 can block the light incident to the CCD 3. The photographic optical system 1 and the mechanical shutter 2 are driven by a motor driver 6.

The CCD 3 converts an optical image formed on an imaging area into an electrical signal and outputs the signal as analog image data. The image information output from the CCD 3 is sent to a correlated double sampling (CDS) circuit 4 where a noise component thereof is removed, and is converted into a digital value by an analog-to-digital (A/D) converter 5, to be output to an image processing circuit 8.

The image processing circuit 8 uses a synchronous dynamic random access memory (SDRAM) 12 that temporarily stores therein image data to perform various image processes such as a YCrCb conversion process, a white-balance control process, a contrast correcting process, an edge enhancement process, and a color conversion process. The white-balance control process is the image process of controlling color density of image information, and the contrast correcting process is the image process of adjusting contrast of image information. The edge enhancement process is the image process of controlling sharpness of image information, and the color conversion process is the image process of controlling hue of image information. The image processing circuit 8 displays image information subjected to signal processing and image processing on a liquid crystal display (LCD) 16.

The image information subjected to the signal processing and the image processing is recorded in a memory card 14 through a compressing/decompressing circuit 13. The compressing/decompressing circuit 13 is a circuit that compresses image information output from the image processing circuit 8 according to an instruction acquired from an operating unit 15 and outputs the compressed image information to the memory card 14, and also decompresses image information read from the memory card 14 and outputs the decompressed image information to the image processing circuit 8.

The digital camera 1000 includes a central processing unit (CPU) 9 that performs various computing processes according to computer programs, and controls respective timing of the CCD 3, the CDS circuit 4, and the A/D converter 5 through a timing signal generator 7 that generates a timing signal. The CPU 9 also controls the image processing circuit 8, the compressing/decompressing circuit 13, and the memory card 14.

The digital camera 1000 further includes a read only memory (ROM) 11 and a random access memory (RAM) 10 which are mutually connected to each other through a bus. The ROM 11 stores therein computer programs or the like, and the RAM 10 is a readable/writable memory which includes a work area for use during the process of various processing and a various-data storage area.

When the face determining process is performed in the digital camera 1000, a system controller loads a computer program for face determination (hereinafter, "face determining program") from the ROM 11 into the RAM 10 and executes it. A computer program for face detection (hereinafter, "face detecting program") accesses an image based on brightness signal Y temporarily stored in the SDRAM, and implements the processes of the block selector 102, the feature-amount calculator 103, the evaluation-value calculator 104, the face-direction determining unit 105, the face-area detector 106, and the display controller 107, respectively, through the system controller. The face detecting program receives the result of the face determining process, and controls auto focus (AF), auto exposure (AE), and auto white balance (AWB) of the camera, through the system controller.

A computer program (hereinafter "image processing program") executed by the digital camera 1000 has modules including the face determination function. As actual hardware, the CPU (processor) loads the image processing program from the storage medium into a main storage and executes it, and thus, the block selector, the feature-amount calculator, the evaluation-value calculator, the face-direction determining unit, the face-area detector, and the display controller and the like are implemented on the main storage.

A second embodiment of the present invention is explained next. According to the second embodiment, not the face determining processor but the image processing apparatus performs the face determining process differently from the first embodiment. The difference from the first embodiment is described below.

In the second embodiment, an image file in which image information captured by, for example, a digital camera is stored is acquired from an image acquiring unit. A component conversion processor converts an image of RGB into a YCrCb system. A brightness and color component separator separates a brightness signal Y from a color signal CrCb. The separated brightness signal Y is subjected to the face determining process. The determined face area is used to correct colors and gamma of an image, and thus the image is optimized.

Figure 11:
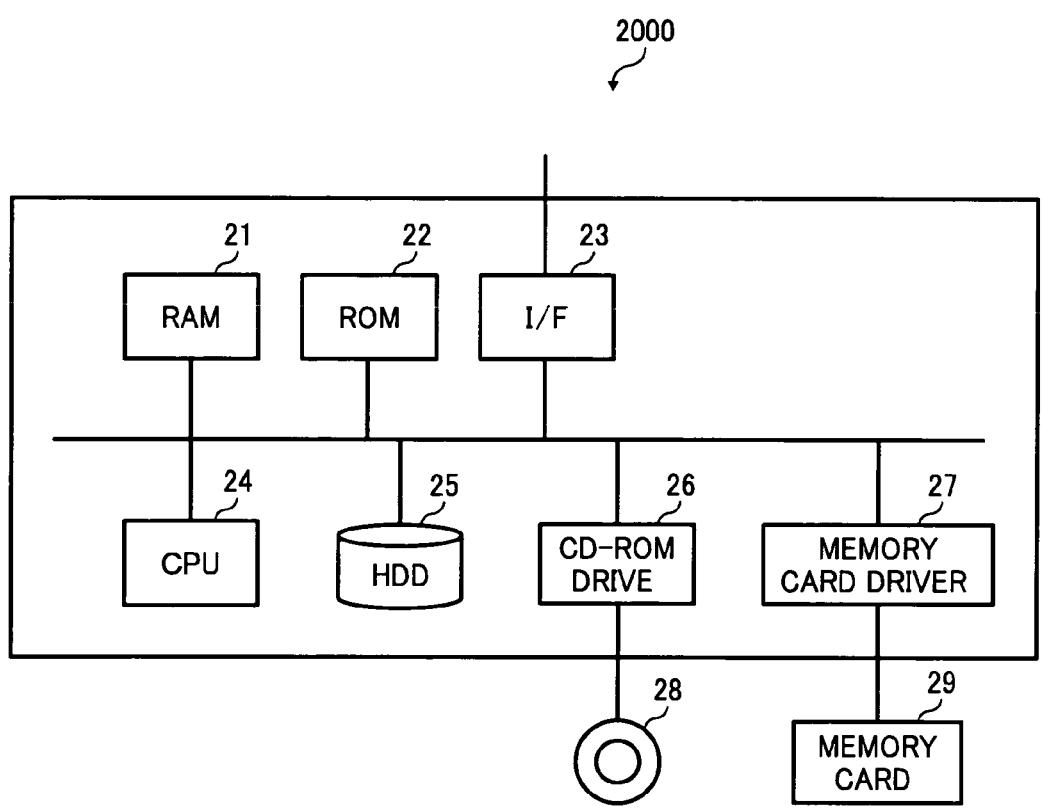
FIG. 11 is a block diagram of a hardware configuration of an image processing apparatus according to a second embodiment of the present invention.

FIG. 11 is a block diagram of a hardware configuration of an image processing apparatus 2000 according to the second embodiment. The image processing apparatus 2000 includes a CPU 24 that integrally control units. The CPU 24 includes a ROM 22 which is a read only memory that stores therein a basic input-output system (BIOS) and a RAM 21 that stores therein various data to be rewritable and that functions as a work area of the CPU, both of which are connected to each other through a bus to form a microcomputer. Connected to the bus are a hard disk drive (HDD) 25 that stores therein a control program, a compact disk read only memory (CD-ROM) drive 26 that reads data from a CD-ROM 28, and an I/F 23 which is an interface through which data is communicated with a printer or the like.

The CD-ROM 28 stores therein a predetermined control program. The CPU 24 reads the control program stored in the CD-ROM 28 by the CD-ROM drive 26 and installs the control program into the HDD 25. Consequently, the various processes are ready to be performed. A memory card 29 stores therein image information or the like, and a memory card driver 27 reads the image information from the memory card 29.

It is noted that, in addition to the CD-ROM and the memory card, various types of recording media can be used to store such control program and information. Examples of the recording media include optical discs such as digital versatile disks (DVD), magneto-optical discs, magnetic disks such as a flexible disk, and a semiconductor memory. Furthermore, the control program can be downloaded via a network such as the Internet to be installed on the HDD 25. In this case, a storage unit in a transmission-side server that stores therein the control program is also considered as one of the recording media cited above. The control program can be run on a predetermined operating system (OS). In this case, part of the processes can be executed by the OS. The control program can be included as part of a group of program files that form predetermined application software such as word processing software and the OS.

The face determining program can be stored in a computer connected to a network such as the Internet and downloaded through the network.

The image processing program can be provided or distributed through a network such as the Internet. The image processing program can also be provided as being previously stored in the ROM or the like. That is, the image processing program can be recorded in a computer-readable recording medium such as a CD-ROM, a flexible disk (FD), CD-recordable (CD-R), and a DVD, as a file in an installable or executable format.

As set forth hereinabove, according to an embodiment of the present invention, it is possible to reduce the processing load and the processing time required for face-area determination.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that detects a face area from image information, the image processing apparatus comprising:
    a storage unit to store a determination pattern, the determination pattern being used to detect a face area from image information; and
    a processor including,
        a determining unit to determine a face direction in which a face image in an image information is upright based on the determination pattern; and
        a detecting unit to match the direction of the image information with the direction of the determination pattern based on the face direction, and to detect a face area from the image information, wherein
            the determination pattern includes a higher hierarchy pattern and a lower hierarchy pattern such that determining the lower hierarchy pattern requires more calculation than the determination of the higher hierarchy pattern,
            the determining unit determines the face direction in order from the higher hierarchy pattern to the lower hierarchy pattern,
            if the face direction can be determined by using the higher hierarchy pattern, finish the determination of the face direction without using the lower hierarchy pattern, and
            if the face direction cannot be determined by using the higher hierarchy pattern, determine the face direction using the lower hierarchy pattern.

2. The image processing apparatus according to claim 1, wherein
    the storage unit stores therein a plurality of determination patterns each corresponding to a determination level, and
    the detecting unit detects the face area from the image information using the determination patterns in ascending order from a determination pattern with a low determination level.

3. The image processing apparatus according to claim 1, wherein
    the storage unit stores therein a plurality of determination patterns, and
    the determining unit determines, when failing to determine the face direction by one of the determination patterns, the face direction by using another one of the determination patterns.

4. The image processing apparatus according to claim 1, wherein the processor further includes:
    a calculating unit to calculate, based on determination patterns obtained by rotating the determination patterns stored in the storage unit different angles, a feature amount to detect a face area from the image information with respect to each of the different angles;
    wherein
    the calculating unit calculates the feature amount for the target face area with respect to each of the different angles.

5. The image processing apparatus according to claim 1, wherein the processor further includes:
    a calculating to calculate, based on determination patterns obtained by rotating the determination pattern stored in the storage unit different angles, a feature amount to detect a face area from the image information with respect to each of the different angles;
    wherein
    the selecting unit selects another face area from the image information when failing to detect the face area from the image information.

6. An image processing method for detecting a face area from image information, the method being performed by an image processing apparatus including a processor and a non-transitory memory, the image processing method comprising:
    storing, in the memory, a determination pattern, the determination pattern being used to detect a face area from image information;
    determining, by the processor, a face direction in which a face image in an image information is upright based on the determination pattern; and
    matching, by the processor, the direction of the image information with the direction of the determination pattern based on the face direction; and
    detecting, by the processor, a face area from the image information, wherein
        the determination pattern includes a higher hierarchy pattern and a lower hierarchy pattern such that determining the lower hierarchy pattern requires more calculation than the determination of the higher hierarchy pattern,
        determining the face direction includes determining the face direction in order from the higher hierarchy pattern to the lower hierarchy pattern,
        if the face direction can be determined by using the higher hierarchy pattern, finish the determination of the face direction without using the lower hierarchy pattern, and
        if the face direction cannot be determined by using the higher hierarchy pattern, determine the face direction using the lower hierarchy pattern.

7. The image processing method according to claim 6, wherein
    the storing includes storing a plurality of determination patterns each corresponding to a determination level, and
    the detecting includes detecting the face area from the image information using the determination patterns in ascending order from a determination pattern with a low determination level.

8. The image processing method according to claim 6, wherein the storing includes storing a plurality of determination patterns, and the determining includes determining, when the face direction is not determined by one of the determination patterns, the face direction by using another one of the determination patterns.

9. The image processing method according to claim 6, further comprising:

calculating, by the processor, based on determination patterns obtained by rotating the determination pattern stored in the memory different angles, a feature amount to detect a face area from the image information with respect to each of the different angles;

wherein the calculating includes calculating the feature amount for the face area with respect to each of the different angles.

10. The image processing method according to claim 6, further comprising:

calculating, by the processor, based on determination patterns obtained by rotating the determination pattern stored in the memory by different angles, a feature amount to detect the face area from the image information with respect to each of the different angles;

wherein the selecting includes selecting another face area from the image information, when failing to detect the face area from the image information.

11. A computer program product including a non-transitory computer usable medium having computer readable program code segments that, when executed by a processor, causes a computer to form the following steps:

storing a determination pattern to detect a face area from image information;

determining, by the processor, a face direction in which a face image in an image information is upright based on the determination pattern;

matching, by the processor, the direction of the image information with direction of the determination pattern based on the face direction; and detecting, by the processor, a face area from the image information, wherein the determination pattern includes a higher hierarchy pattern and a lower hierarchy pattern such that determining the lower hierarchy pattern requires more calculation than the determination of the higher hierarchy pattern, determining the face direction includes determining the face direction in order from the higher hierarchy pattern to the lower hierarchy pattern, if the face direction can be determined by using the higher hierarchy pattern, finish the determination of the face direction without using the lower hierarchy pattern, and if the face direction cannot be determined by using the higher hierarchy pattern, determine the face direction using the lower hierarchy pattern.

12. The computer program product according to claim 11, wherein the storing includes storing a plurality of determination patterns each corresponding to a determination level, and the detecting includes detecting the face area from the image information using the determination patterns in ascending order from a determination pattern with a low determination level.

13. The computer program product according to claim 11, wherein the storing includes storing a plurality of determination patterns, and the determining includes determining, when the face direction is not determined by one of the determination patterns, the face direction by using another one of the determination patterns.

14. The computer program product according to claim 11, wherein, the steps further include, calculating, by the processor, based on determination patterns obtained by rotating the determination pattern stored in the storage unit different angles, a feature amount to detect a face area from the image information with respect to each of the different angles, wherein the calculating includes calculating the feature amount for the target face area with respect to each of the different angles.

15. The image processing apparatus according to claim 1, wherein the processor further includes, a calculating unit to calculate, based on determination patterns obtained by rotating the determination pattern stored in the storage unit by different angles, a feature amount to detect the face area from the image information with respect to each of the different angles, wherein the determining unit determines a direction in which the feature amount exceeds a predetermined threshold as the face direction.

16. The image processing apparatus according to claim 1, wherein the processor further includes, a calculating unit to calculate, based on determination pattern, a feature amount to detect a face area from a rotated image information obtained by different angles with respect to each of the different angles, wherein the determining unit determines a direction in which the feature amount exceeds a predetermined threshold as the face direction.

17. The image processing method according to claim 6, further comprising calculating, by the processor, based on determination patterns obtained by rotating the determination pattern stored in the memory by different angles, a feature amount to detect a face area from the image information with respect to each of the different angles, wherein the determining includes determining a direction in which the feature amount exceeds a predetermined threshold as the face direction.

18. The image processing method according to claim 6, further comprising calculating, by the processor, based on the determination pattern, a feature amount to detect a face area from a rotated image information obtained by rotating the image information by different angles with respect to each of the different angles, wherein the determining includes determining a direction in which the feature amount exceeds a predetermined threshold as the face direction.

19. The computer program product according to claim 11, wherein the steps further include, calculating, by the processor, based on determination patterns obtained by rotating the determination pattern stored different angles, a feature amount to detect a face area from the image information with respect to each of the different angles, wherein the determining includes determining a direction in which the feature amount exceeds a predetermined threshold as the face direction.

20. The computer program product according to claim 11, wherein the steps further include,
   calculating, by the processor, based on the determination pattern, a feature amount to detect a face area from the image information rotated different angles with respect to each of the different angles, wherein
the determining includes determining a direction in which the feature amount exceeds a predetermined threshold as the face direction.

* * * * *